United States Patent
Howard et al.

(10) Patent No.: US 12,312,197 B2
(45) Date of Patent: May 27, 2025

(54) METHOD OF PREPARING SHEET MATERIAL FOR DIVIDING INTO DISCRETE STACKS

(71) Applicant: Dyson Technology Limited, Wiltshire (GB)

(72) Inventors: Joseph Daniel Howard, Swindon (GB); Benjamin Jon Clements, Oldham (GB); Gregory Stanley Sheard, Batley (GB)

(73) Assignee: Dyson Technology Limited, Malmesbury (GB)

( * ) Notice: Subject to any disclaimer, the term of this patent is extended or adjusted under 35 U.S.C. 154(b) by 503 days.

(21) Appl. No.: 17/783,993

(22) PCT Filed: Dec. 4, 2020

(86) PCT No.: PCT/GB2020/053122
§ 371 (c)(1),
(2) Date: Jun. 9, 2022

(87) PCT Pub. No.: WO2021/116664
PCT Pub. Date: Jun. 17, 2021

(65) Prior Publication Data
US 2023/0025451 A1    Jan. 26, 2023

(30) Foreign Application Priority Data
Dec. 11, 2019 (GB) ..................... 1918187

(51) Int. Cl.
*B65H 35/08*  (2006.01)
*B23K 26/08*  (2014.01)
(Continued)

(52) U.S. Cl.
CPC ......... *B65H 35/08* (2013.01); *B23K 26/0823* (2013.01); *B23K 26/38* (2013.01);
(Continued)

(58) Field of Classification Search
CPC ................ B65H 35/08; B65H 35/10; B65H 2301/42172; B65H 2301/515123;
(Continued)

(56) References Cited

U.S. PATENT DOCUMENTS 2,652,617 A    9/1953  Willard
3,082,141 A *  3/1963  Steele ............... B31D 3/0269
                                                    156/196

(Continued)

FOREIGN PATENT DOCUMENTS

CN    101959779 A    1/2011
CN    103460442 A    12/2013
(Continued)

OTHER PUBLICATIONS

Office Action received for Chinese Patent Application No. 202080085503.7, mailed on Aug. 1, 2023, 18 pages (10 pages of English Translation and 8 pages of Original Document).
(Continued)

*Primary Examiner* — Omar Flores Sanchez
(74) *Attorney, Agent, or Firm* — Tucker Ellis LLP; Michael G. Craig

(57) ABSTRACT

A method of preparing an elongate web of sheet material for dividing into discrete stacks of web portions after reeling the web onto a drum is provided. The method includes forming transverse discontinuities in the web at spaced intervals corresponding to edges of the discrete stacks to be formed, the intervals progressively increasing along the web so that the discontinuities form angularly-aligned groups when reeled onto the drum.

32 Claims, 10 Drawing Sheets

(51) Int. Cl.
  *B23K 26/38* (2014.01)
  *B65H 35/10* (2006.01)
(52) U.S. Cl.
  CPC ...... *B65H 35/10* (2013.01); *B65H 2301/42172* (2013.01); *B65H 2301/515123* (2013.01); *B65H 2301/51514* (2013.01); *B65H 2301/5152* (2013.01); *B65H 2801/72* (2013.01)
(58) Field of Classification Search
  CPC .. B65H 2301/51514; B65H 2301/5152; B65H 2801/72; B23K 26/0823; B23K 26/38
  See application file for complete search history.

(56) References Cited

U.S. PATENT DOCUMENTS

| | | | |
|---|---|---|---|
| 3,147,166 A | 9/1964 | Friday | |
| 3,683,729 A * | 8/1972 | Cloud | B65H 29/6609 |
| | | | 53/550 |
| 3,789,095 A | 1/1974 | Winstead | |
| 4,190,241 A * | 2/1980 | Krueger | B65H 31/3081 |
| | | | 270/47 |
| 4,413,964 A | 11/1983 | Winstead | |
| 5,279,470 A | 1/1994 | Birkmann et al. | |
| 5,670,001 A * | 9/1997 | Huebner | B31D 3/0276 |
| | | | 428/116 |
| 6,030,481 A * | 2/2000 | Winter | B65H 37/04 |
| | | | 156/562 |
| 6,250,220 B1 | 6/2001 | Sainio et al. | |
| 6,354,534 B1 | 3/2002 | Matsunaga et al. | |
| 6,428,644 B1 | 8/2002 | Ohno et al. | |
| 6,910,571 B1 * | 6/2005 | Ertel | B65G 21/105 |
| | | | 492/38 |
| 7,169,232 B2 | 1/2007 | Strip et al. | |
| 7,947,149 B2 | 5/2011 | Myatt et al. | |
| 9,385,395 B2 | 7/2016 | Wu | |
| 2004/0103972 A1 | 6/2004 | Tabor | |
| 2011/0062275 A1 | 3/2011 | Westphal et al. | |
| 2013/0319984 A1 * | 12/2013 | Linyaev | B23K 26/106 |
| | | | 219/121.72 |
| 2014/0033883 A1 | 2/2014 | Yuhara et al. | |
| 2014/0135192 A1 * | 5/2014 | Andersson | B65H 45/24 |
| | | | 493/356 |
| 2014/0215810 A1 | 8/2014 | Kim et al. | |
| 2014/0220399 A1 * | 8/2014 | Ebert | H01M 10/654 |
| | | | 429/94 |
| 2016/0159610 A1 | 6/2016 | McNestry | |
| 2018/0297810 A1 * | 10/2018 | Gohda | B65H 54/58 |
| 2023/0007877 A1 * | 1/2023 | Howard | H01M 10/0404 |
| 2023/0136940 A1 * | 5/2023 | Rodriguez | B65H 23/195 |
| | | | 242/532.3 |

FOREIGN PATENT DOCUMENTS

| | | |
|---|---|---|
| CN | 103857613 A | 6/2014 |
| CN | 105339272 A | 2/2016 |
| CN | 106715302 A | 5/2017 |
| CN | 109835752 A | 6/2019 |
| DE | 102017216133 A1 | 3/2019 |
| EP | 2696390 A1 | 2/2014 |
| EP | 3028976 A1 | 6/2016 |
| GB | 0951631 A | 3/1964 |
| GB | 2589889 A | 6/2021 |
| JP | 56-140612 U | 10/1981 |
| JP | 01-099962 A | 4/1989 |
| JP | 2642014 B2 | 8/1997 |
| JP | 2009-196021 A | 9/2009 |
| JP | 2011-003381 A | 1/2011 |
| JP | 2011-086507 A | 4/2011 |
| JP | 2011-086508 A | 4/2011 |
| JP | 2012-199211 A | 10/2012 |
| JP | 2014-517988 A | 7/2014 |
| JP | 2015-505145 A | 2/2015 |
| JP | 2017-062919 A | 3/2017 |
| JP | 2017-199589 A | 11/2017 |
| JP | 2018-166080 A | 10/2018 |
| KR | 20190058574 A | 5/2019 |
| WO | 2013/051478 A1 | 4/2013 |
| WO | 2016/100751 A2 | 6/2016 |
| WO | 2017/169020 A1 | 10/2017 |

OTHER PUBLICATIONS

Office Action received for Japanese Patent Application No. 2022-535751, mailed on Aug. 15, 2023, 6 pages (3 pages of English Translation and 3 pages of Original Document).
Combined Search and Examination Report Received for GB Application No. 1918187.4, mailed on May 28, 2020, 4 pages.
GB Search Report Received for GB Application No. 1918185.8, mailed on May 28, 2020, 2 pages.
International Search Report and Written Opinion received for PCT Patent Application No. PCT/GB2020/053122, mailed on Mar. 11, 2021, 11 pages.
International Search Report and Written Opinion received for PCT Patent Application No. PCT/GB2020/053123, mailed on Mar. 11, 2021, 10 pages.
Office Action received for Japanese Patent Application No. 2022-535754, mailed on Jun. 27, 2023, 10 pages (5 pages of English Translation and 5 pages of Original Document).

* cited by examiner

METHOD OF PREPARING SHEET MATERIAL FOR DIVIDING INTO DISCRETE STACKS

CROSS-REFERENCE TO PRIOR APPLICATION

This application is a § 371 National Stage Application of PCT International Application No. PCT/GB2020/053122 filed Dec. 4, 2020, which claims the priority of United Kingdom Application No. 1918187.4, filed Dec. 11, 2019, each of which are herein incorporated by reference in their entirety.

TECHNICAL FIELD

The invention relates to a method of preparing sheet material for dividing into discrete stacks. In particular, the invention relates to preparing a web of sheet material to be divided or otherwise singulated into discrete stacks after reeling onto a drum, such stacks defining solid-state devices such as solid-state batteries.

BACKGROUND

Despite promising various advantages, solid-state battery technology has historically been prohibitively expensive and notoriously resistant to economies-of-scale, which has thus far prevented its general adoption.

To illustrate the challenges involved in mass-producing SSBs, in one approach SSB cell stacks may be formed on a continuous thin film substrate to define a "web", which is folded or wound into layers and then cut to form discrete multi-layer stacks. The web is defined by a layered structure composed of discrete layers of the requisite anode, cathode and electrolyte materials on a substrate, and so each stack defines a stack of SSB cells. Such webs must be extremely thin, in the order of a few microns, to minimise resistivity and maximise energy density. Cost viability also dictates that the web must be of great length, for example in the order of hundreds of metres. Handling such long and thin webs is a considerable challenge, especially if the stacks are to be formed at high speed and without damage to the web.

To complicate matters further, the number of layers in an SSB stack may be an order of magnitude greater than for equivalent stacks of conventional battery cells. In consequence, tolerances governing alignment of the edges of the layers of each stack are smaller, since alignment errors accumulate as layers are added.

It is against this background that the present invention has been devised.

SUMMARY OF THE INVENTION

An aspect of the invention provides a method of preparing an elongate web of sheet material for dividing into discrete stacks of web portions after reeling the web onto a drum. The method comprises forming transverse discontinuities in the web at spaced intervals corresponding to edges of the discrete stacks to be formed, the intervals progressively increasing along the web so that the discontinuities form angularly-aligned groups when reeled onto the drum.

Forming discontinuities in the web weakens the web at those points, meaning that the web can be more easily broken into discrete stacks of web portions on expanding the drum, for example. Accordingly, creating discontinuities enables the shape of the final stacks to be controlled. Ensuring that the discontinuities align on the drum means that the edges of the layers of each stack will align following division into stacks.

Each discontinuity may comprise a transverse series of perforations. In this case, the method may comprise perforating the web at regular or irregular intervals to form each series of perforations. The perforations of each series may be polygonal, for example comprising any of: a parallelogram shape; a hexagonal shape; a triangular shape; or a diamond shape.

Alternatively, or in addition, each discontinuity may comprise a thinned portion of the web. In such embodiments, the method may comprise forming each thinned portion by removing part of one or more coating layers of the web, for example by ablating the web to form the thinned portion. Such methods may comprise progressively increasing the widths of the thinned portions along the web. For example, the method may comprise increasing the widths of the thinned portions in accordance with the intervals between the discontinuities, so that spaces between successive thinned portions are constant along the web. This beneficially minimises parasitic mass in the final discrete stacks, and also helps to ensure that edges of the full thickness regions of the web align.

In some embodiments the discontinuities comprise a combination of perforations and thinned portions of the web. For example, each discontinuity may comprise a transverse series of perforations extending centrally through a thinned portion of the web.

The method may comprise forming the discontinuities during reeling of the web. Each discontinuity may be formed on a portion of the web that is on the drum. For example, the method may comprise reeling multiple layers of the web onto the drum, and then perforating the layers together. The method may also comprise forming each discontinuity when the drum is at one of a set of predefined angular positions.

Alternatively, the method may comprise forming each discontinuity on a portion of the web yet to be reeled onto the drum. It is also possible to form some discontinuities on portions of the web that are on the drum, and to form other discontinuities on portions of the web yet to be reeled onto the drum.

The method may comprise forming a discontinuity while the drum rotates. Discontinuities may also be formed while the drum is stationary.

Forming each discontinuity may comprise laser cutting and/or mechanical cutting.

The web may comprise a substrate layer and one or more coating layers, in which case forming a discontinuity may involve local removal of one or more of the coating layers, for example by ablation.

Each stack formed from the web may define a solid-state electrical device.

The invention also extends to a method of producing stacks of web portions from an elongate web of sheet material. The method comprises: preparing the web using the method of the above aspect; reeling the web onto a drum so that discontinuities of successive layers of the web align on the drum; and expanding the drum to increase tension in the web and break the web at each of the discontinuities, thereby dividing the web into respective stacks on each drum segment.

The invention also embraces a control system arranged to control a web processing system to perform the method of the above aspect to prepare an elongate web of sheet material for dividing into discrete stacks of web portions, and/or to produce said stacks of web portions.

Another aspect of the invention provides a web processing system configured to prepare an elongate web of sheet material for dividing into discrete stacks of web portions after reeling the web onto a drum. The system comprises discontinuity-forming equipment arranged to form transverse discontinuities in the web at progressively increasing intervals corresponding to edges of the stacks to be formed, so that the discontinuities form angularly-aligned groups when reeled onto the drum.

The discontinuity-forming equipment is optionally configured to perforate and/or ablate the web to form discontinuities.

The discontinuity-forming equipment may comprise a laser and/or a cutting member such as a blade.

A further aspect of the invention provides an elongate web of sheet material comprising transverse discontinuities at progressively increasing intervals.

The web may comprise a substrate layer and one or more coating layers.

Each discontinuity may comprise a transverse series of perforations. The perforations of each series may be polygonal, for example comprising any of: a parallelogram shape; a hexagonal shape; a triangular shape; or a diamond shape. The perforations of each series may be spaced at regular or irregular intervals.

Each discontinuity may comprise a thinned portion of the web, in which case the method may comprise forming each thinned portion by removing part of one or more coating layers of the web. The widths of the thinned portions may progressively increase along the web. For example, the widths of the thinned portions may increase in accordance with the intervals between the discontinuities, so that spaces between successive thinned portions are constant along the web.

Alternatively, or in addition, each discontinuity may comprise a transverse series of perforations extending centrally through a thinned portion of the web.

It will be appreciated that preferred and/or optional features of each aspect of the invention may be incorporated alone or in appropriate combination in the other aspects of the invention also.

BRIEF DESCRIPTION OF THE DRAWINGS

One or more embodiments of the invention will now be described, by way of example only, with reference to the accompanying drawings, in which.

DETAILED DESCRIPTION

To meet the challenges involved in mass producing solid state devices such as batteries, embodiments of the invention form such devices by folding and dividing elongate webs of sheet material into discrete stacks. As already noted, such webs may be only a few microns in thickness whilst being hundreds of meters in length, making them difficult to handle.

For example, as it is so thin the web is extremely lightweight and fragile, giving rise to the conflicting challenges of holding the web under tension to preserve its shape and control its position, while limiting that tension to avoid rupturing the web.

As also noted above, it is desirable to maximise the number of layers in each stack to yield a corresponding increase in energy density, which entails many folds in the web and the associated increased difficulty in ensuring that the edges of the layers of the stack remain aligned. Folding the web also creates a high bend radius at each fold, which generates stress in the web coatings.

For this reason, conventional S-folding techniques used for fabricating other electrical devices have been found unsuitable for forming solid-state devices in this way.

Accordingly, embodiments of the invention provide an approach to folding and dividing the web that minimises fluctuations in the tension applied to the web, reduces the bend radius applied to the web and also ensures accurate edge alignment. In broad terms, this approach involves reeling the web onto a drum, creating transverse discontinuities in the web such as perforations and/or ablated regions such that the discontinuities form angularly spaced, radially-aligned groups on the drum, and then expanding the drum to increase hoop stress to break the reeled web along each discontinuity to produce the discrete stacks that will define solid-state devices.

Figure 1:
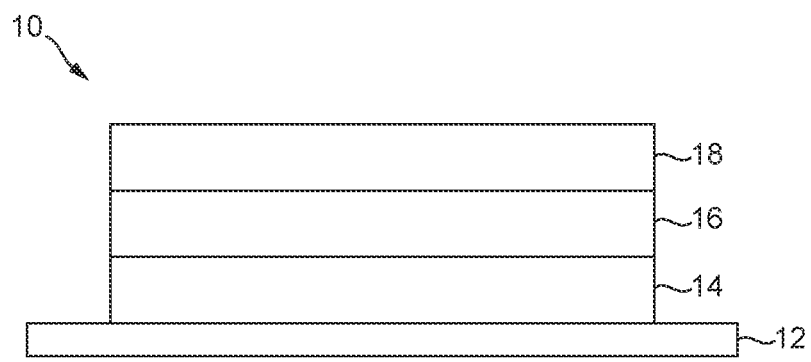
FIG. 1 shows in schematic form a web suitable for producing solid-state devices in embodiments of the invention.

In that context, FIG. 1 shows in schematic form the structure of a web 10 that may be used in embodiments of the invention. The web 10 is defined by a layered structure, which in this case is composed of four discrete layers, each layer extending uniformly through the web in two dimensions.

In upward vertical succession as viewed in FIG. 1, the web comprises: a substrate 12; an anode layer 14; an electrolyte layer 16; and a cathode layer 18. It should be appreciated that FIG. 1 is entirely schematic, and so the relative thicknesses of the layers may be different in practice.

The substrate 12 is of a suitable thin plastics web material such as PET (polyethylene terephthalate), and is of one micron or less in thickness in this embodiment; although in other embodiments the substrate 12 could be thicker, for example up to 10 microns.

The anode, electrolyte and cathode layers are formed onto the substrate 12 as coatings using well-known techniques.

In this embodiment, the anode layer 14 is formed from lithium metal, although lithium alloy may alternatively be used. The electrolyte layer 16 is of lithium phosphorous oxynitride, but other suitable fast ion conductors are known. It follows from this that the material selected for the cathode layer 18 is suitable for storing lithium ions by virtue of stable chemical reactions. Suitable materials for the cathode layer 18 therefore include lithium cobalt oxide, lithium iron phosphate or alkali metal polysulphide salts, although any alkali metal oxide supplemented with aluminium, manganese and/or cobalt may be used.

The skilled person will be aware of other materials suitable for forming solid-state device cells, and any compatible combination of such materials may be implemented in embodiments of the invention.

The skilled reader will appreciate that the structure shown in FIG. 1 provides all of the requisite layers to define a cell of a solid-state battery device. The web 10 could therefore be characterised as a single solid-state cell, albeit one that is too large to serve a practical purpose. Accordingly, the web 10 is broken or otherwise divided into smaller web portions, each web portion defining a solid-state cell of a useful size. These cells are stacked to form solid-state devices of high energy density, most conveniently by folding or otherwise layering the web 10 before dividing it, and in this case by reeling it onto a drum as described below.

The web 10 shown in FIG. 1 represents one of the simplest structures that may be used, but in other embodiments further layers may be included so that the substrate 12 supports multiple cells. This beneficially minimises the parasitic mass represented by the substrate 12, in turn improving the energy density of solid-state devices produced from the web 10.

For example, the cathode, electrolyte and anode layers 14, 16, 18 may be repeated, so that the substrate 12 supports the requisite layers for two cells of a solid-state device, with one cell stacked on top of the other.

The additional set of anode, electrolyte and cathode layers may be added on top of those present in the example shown in FIG. 1 to repeat the layering pattern, in which case a barrier layer may be provided between the respective sets of cathode, electrolyte and anode layers to separate the respective cells.

Another option is to add an electrolyte layer followed by an anode layer onto the FIG. 1 structure, meaning that the cathode layer 18 effectively forms part of two cells. In this scenario, the cathode layer may be thicker than for the single cell arrangement of FIG. 1.

Alternatively, or in addition, further coating layers may be added to the underside of the substrate 12, so that the substrate 12 becomes sandwiched between two sets of anode, electrolyte and cathode layers.

In principle, it is possible for the web 10 to have any number of layers in any of the configurations noted above for the purposes of the invention.

To ease manufacture, transport and handling, the web 10 to be reeled onto the drum is typically cut from a reel of sheet material having a width that is much greater than the intended width of the solid-state devices to be produced. Accordingly, an initial step in the process for producing discrete stacks of web portions defining multi-celled solid-state devices is to cut the sheet material into ribbon-like webs 10 having a width corresponding to the desired width of the solid-state devices to be produced. Each web 10 can then be wound onto the drum individually to be divided into the final stacks that will define the solid-state devices.

Figure 2:
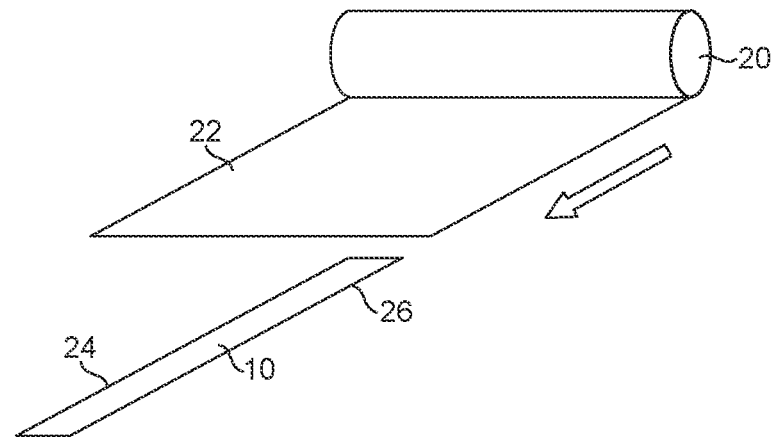
FIG. 2 shows an initial processing step for the web of FIG. 1.

This step is illustrated in FIG. 2, which shows a reel 20 of sheet material 22 being unwound in the direction indicated by the arrow, and cut longitudinally to produce a web 10 that is approximately one sixth of the width of the reel. Accordingly, six such webs are produced from the sheet material 22, although only one is shown in FIG. 2 for simplicity. As FIG. 2 indicates, the web 10 is also cut to length ready for reeling onto the drum.

Once cut, films or foils of appropriate materials are deposited along the long sides of the web 10 to define current collectors for the anode and cathode layers 14, 18, an anode current collector 24 being formed along one side of the web 10 and a cathode current collector 26 being formed along the opposite side. The anode current collector 24 may be formed from zinc, aluminium, platinum or nickel, for example. The cathode current collector 26 is of nickel in this embodiment, but platinum or aluminium may alternatively be used.

Figure 3:
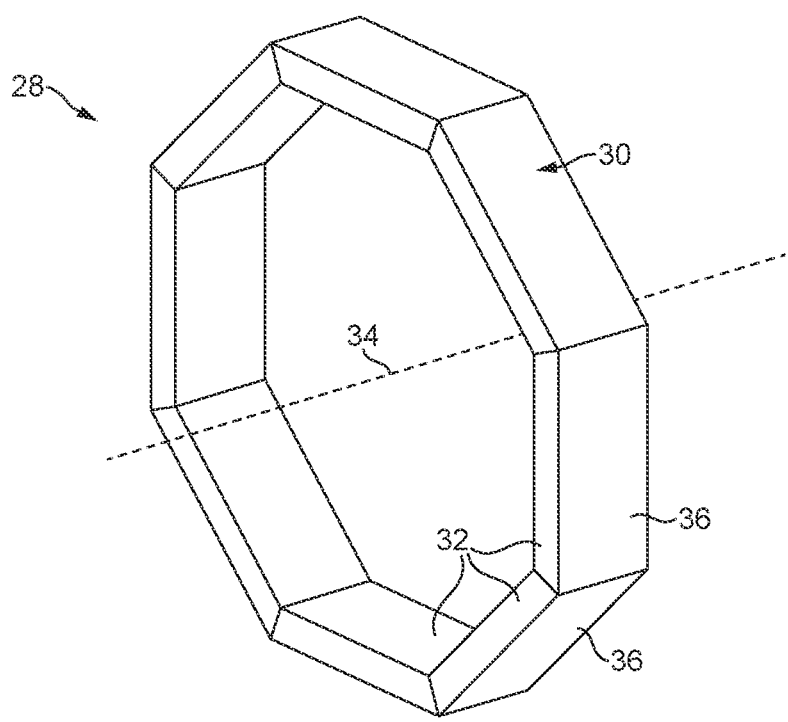
FIG. 3 is a perspective view of an expandable drum configured to reel and divide the web of FIG. 1 into discrete stacks.
Figure 4:
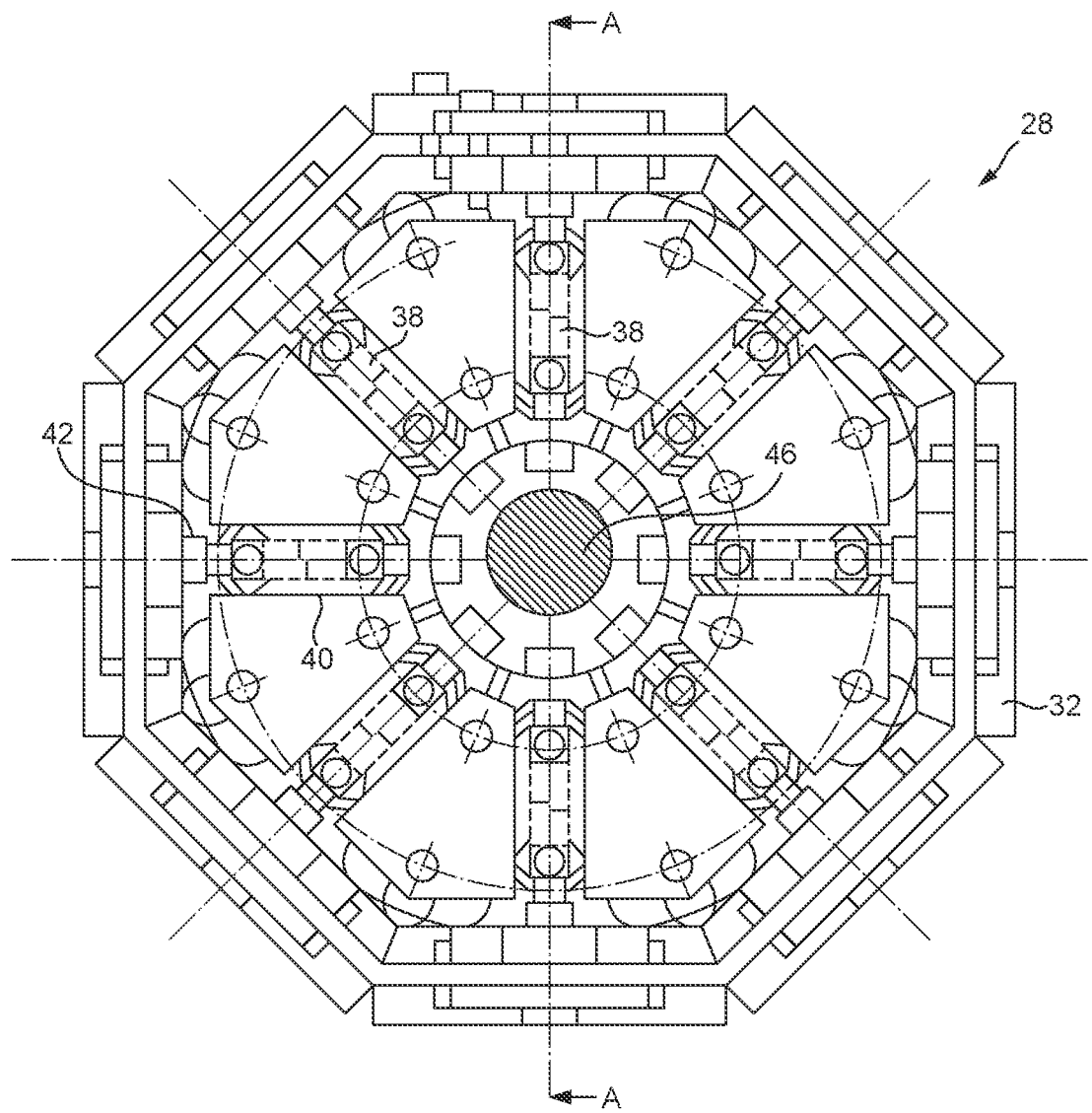
FIG. 4 shows the drum of FIG. 3 from the front to reveal internal features of the drum.

FIG. 3 shows in perspective view an embodiment of a drum 28 for reeling and dividing a web 10 prepared as outlined above to produce discrete stacks of web portions. The drum 28 is greatly simplified in FIG. 3 to show only elements forming a web-receiving loop 30 onto which a web 10 may be wound. FIG. 4 shows more of the internal structure of the drum 28.

In the embodiment shown in FIG. 3, the drum 28 comprises eight identical drum elements in the form of flat plates 32 arranged in a loop around a central axis 34, such that the loop assumes the form of a regular, eight-sided polygon. Each plate 32 has a planar, oblong web-receiving surface 36 that faces radially outwardly to define a respective face of the drum 28.

Each plate 32 is an isosceles trapezium in radial cross-section, the longer base of the trapezium corresponding to the web-receiving surface 36. This shape allows the plates 32 to engage one another such that their respective web-receiving surfaces 36 adjoin to form a substantially continuous surface that defines the web-receiving loop 30.

Accordingly, the surface defining the web-receiving loop 30 extends continuously circumferentially, and extends parallel to the central axis 34 between a front and a rear of the drum 28 with respect to the orientation depicted in FIG. 3. The lengths of the plates 32 therefore define the axial extent of the web-receiving loop 30, which is sized to correspond to the width of webs to be reeled onto the drum 28. In turn, the width of a web 10 corresponds to the length of solid-state devices to be formed from the web 10 using the drum 28.

The plates 32 are supported for relative movement such that the drum 28 is expandable from a closed state, in which the web-receiving surfaces 36 of the plates 32 adjoin, to move the plates 32 apart and thereby increase the length of the web-receiving loop 30, in turn raising tension in a web 10 that has been wound onto the drum 28 to break the web 10 into discrete stacks. Accordingly, the drum 28 may be considered segmented in that each plate 32 defines a respective drum segment. In other embodiments, drum segments may be formed from multiple elements such as plates or wedges.

The skilled reader will appreciate that there are various ways in which the plates 32 may move relative to one another to increase the length of the web-receiving loop 30 and thereby apply increasing tension to a reeled web 10. In this embodiment, the plates 32 are arranged to move radially outwardly in unison to expand the web-receiving loop 30, and then to move radially inwardly to return the drum 28 to its original state.

In this respect, FIG. 4 shows the drum 28 from the front, revealing a circular array of independently-operable double-acting actuators 38 that each supports a respective plate 32 of the drum 28 at an end of the plate 32 at the front of the drum 28. Each actuator 38 comprises a radially-inward body 40 and a radially outward arm 42 arranged telescopically within the body 40, such that the arm 42 is moveable linearly into and out of the body 40 to extend and contract the actuator.

The actuators 38 are collectively supported by a frame of the drum 28, which secures the body 40 of each actuator 38 in a fixed position relative to the frame. The arm 42 of each actuator 38 is coupled to a respective plate 32, so that extension of the actuator 38 by outward movement of the arm 42 drives corresponding radial movement of the plate 32 with respect to the frame.

A central axle 46 is journalled within the frame, so that the drum 28 is rotatable when the axle 46 is mounted on a drum support.

It should be appreciated that a corresponding set of actuators sits directly behind those visible in FIG. 4 to support the corresponding ends of the plates 32 at the rear of the drum 28. Accordingly, the drum 28 comprises a front set of actuators and a rear set of actuators, and each plate 32 is supported by a respective pair of actuators, one from each set.

Each actuator arm 42 connects to its respective plate 32 through a suitable linkage that allows the plate 32 to pivot about an axis parallel to the edge of the web-receiving surface 36 of the plate 32 coinciding with the front of the drum 28. The linkage also allows for axial movement of the plate 32 relative to the actuator 38 to some extent. In this way, the front and rear actuators 38 may extend by different amounts to impart both radial and rotational movement to the associated plate 32, thereby tilting the plate 32 relative to the central axis 34. Notably, this allows for differential radial expansion of the front and rear of the drum 28 through suitable control of the front and rear sets of actuators 38.

As an alternative means of accommodating tilting of the plate 32 relative to the central axis 34 as a result of differential radial extension of the actuators 38 at each end of the plate 32, one or both of the actuators 38 attached to a plate 32 may be pivotable relative to the frame.

This arrangement gives rise to various movement modes for the drum 28 by operating the actuators 38 in different ways. Different movement modes may offer benefits in use for dividing webs reeled onto the drum 28, as shall be explained later. First, some specific movement modes are considered in more detail.

Figure 5A:
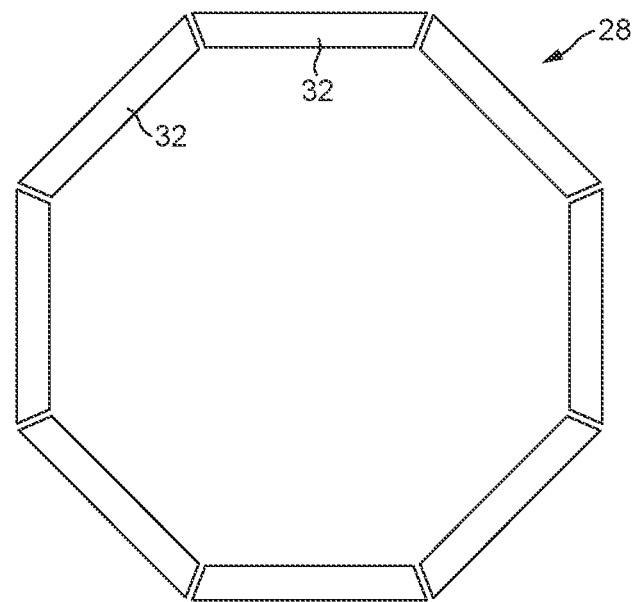
FIGS. 5a and 5b show, in front and perspective views respectively, the drum in an initial stage of radial expansion.
Figure 5B:
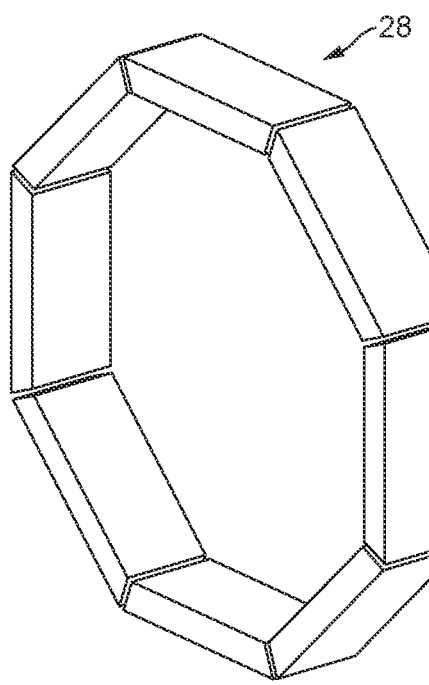
Figure 6A:
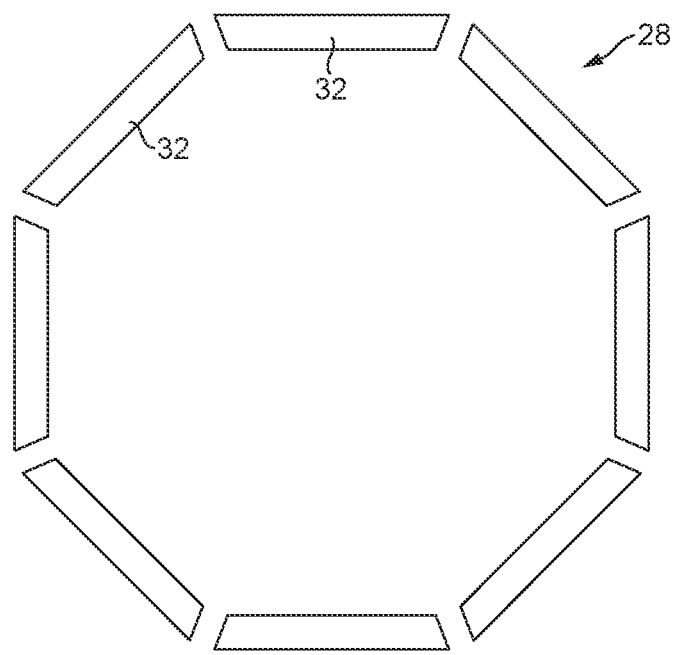
FIGS. 6a and 6b correspond to FIGS. 5a and 5b but show the drum in a fully expanded state.
Figure 6B:
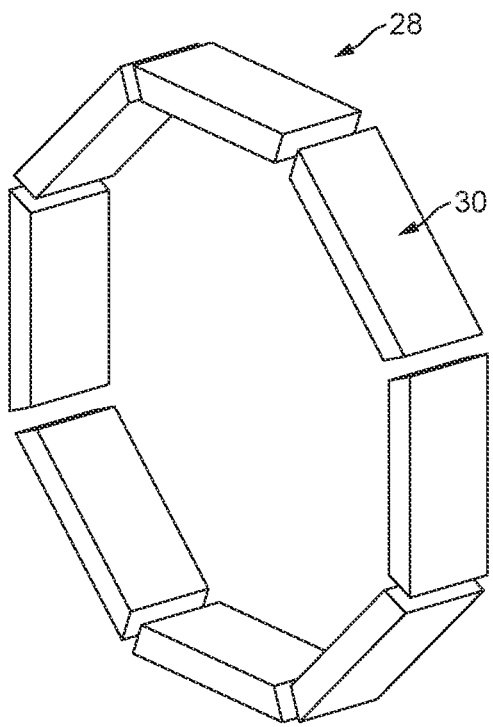

The simplest movement mode is illustrated in FIGS. 5a to 6b, in which the actuators 38 are operated in unison to extend at the same rate so that the front and rear of the drum 28 expand radially in equal measure. This is referred to as a 'true radial' motion. FIGS. 5a and 5b show the drum 28 in front and perspective views respectively as the plates 32 begin to move apart, so that small gaps are visible between each pair of neighbouring plates 32. This movement continues until the drum 28 reaches the state shown in FIGS. 6a and 6b, in which the gaps between the plates 32 have grown such that the overall length of the web-receiving loop 30 defined by the plates 32 has increased significantly compared to the original state of FIG. 3. For example, for a drum 28 having a diameter of between 0.5 and 2 metres, each plate 32 may undergo radial movement of around 5-10 mm to expand the web-receiving loop 30, although these dimensions and distances will vary according to the requirements of each application.

By virtue of the independently operable actuators 38, the plates 32 are also supported such that the axial ends of each plate 32 can move to a differing extent, as already noted. So, the front and the rear of the drum 28 may undergo differential radial expansion, which is referred to as an 'umbrella' motion and is illustrated in FIGS. 7a to 9b.

Figure 7A:
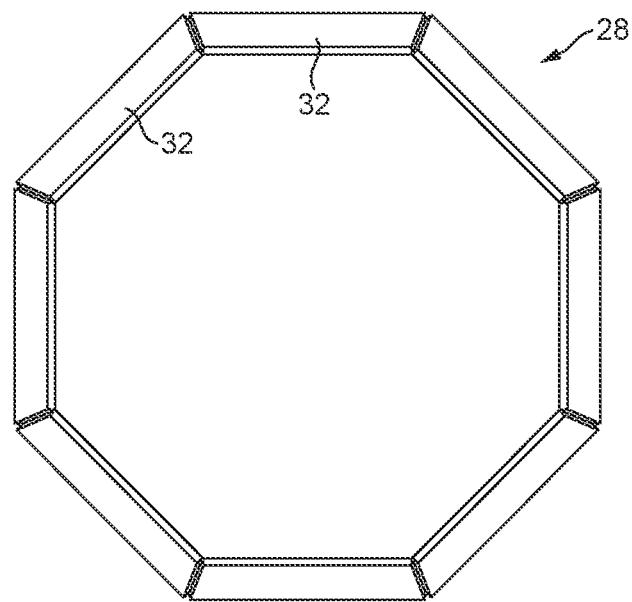
FIGS. 7a, 8a and 9a show the drum from the front during three stages of an umbrella movement mode, while FIGS. 7b, 8b and 9b correspond, respectively, to FIGS. 7a, 8a and 9a, but show the drum in perspective view.
Figure 7B:
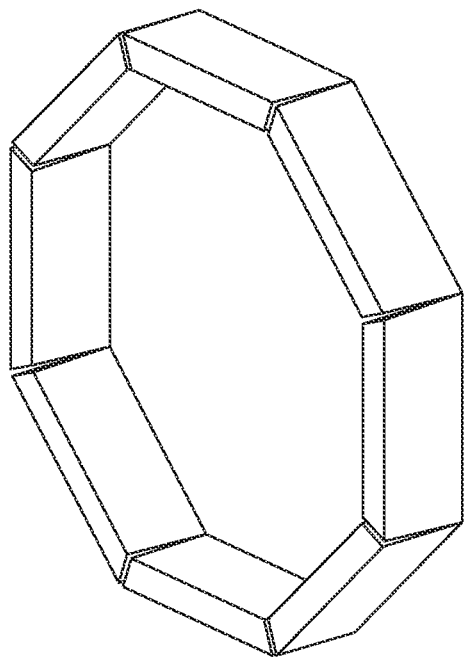

FIGS. 7a and 7b show, in front and perspective views respectively, gaps starting to form between the plates 32 at the front of the drum 28 only, as the plates 32 begin to tilt. As seen most clearly in FIG. 7b, at this stage the plates 32 remain in contact with one another at the rear of the drum 28. This state results from initiating expansion of the front set of actuators 38 while holding the rear set of actuators 38 in a retracted state, causing each plate 32 to tilt relative to the central axis 34 so that the plates 32 collectively splay outwardly at the front of the drum 28.

Figure 8A:
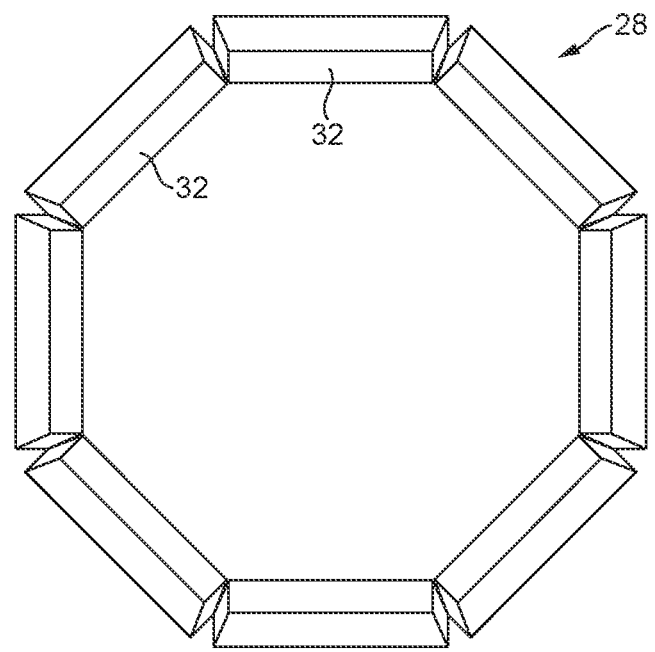
Figure 8B:
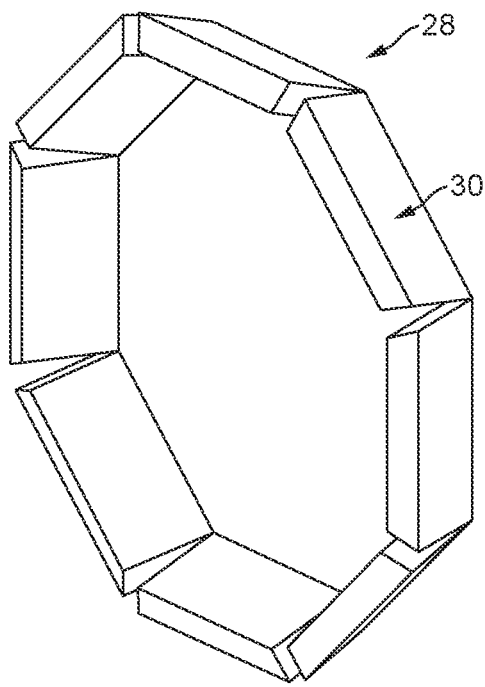
Figure 9A:
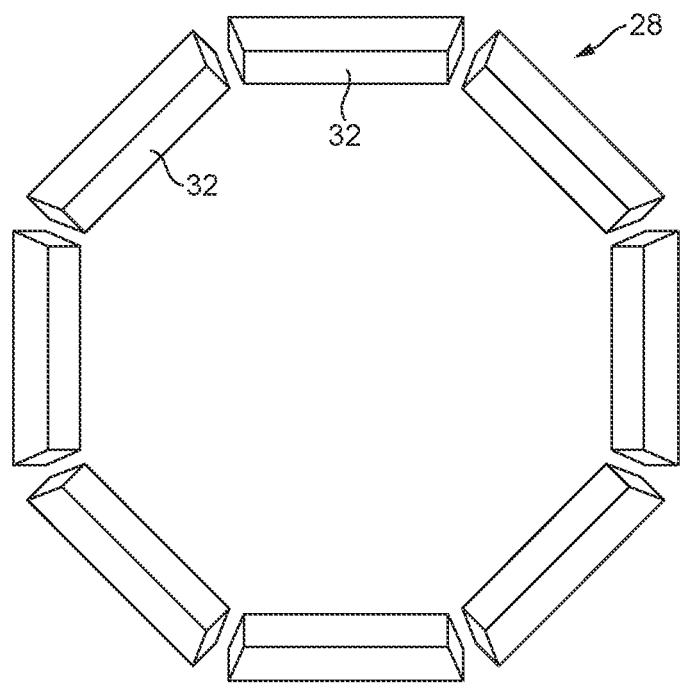
Figure 9B:
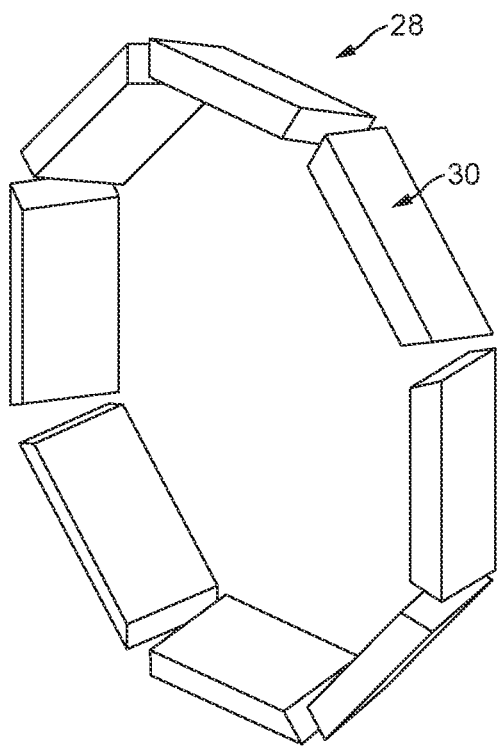

FIGS. 8a and 8b correspond to FIGS. 7a and 7b but show a later stage of the process, at which the front of the drum 28 has expanded to a greater extent. At this stage, the second set of actuators 38 are activated so that the rear of the drum 28 begins to expand also. The front and rear sets of actuators 38 are then controlled so that all actuators 38 expand at a uniform rate to maintain a constant tilt in each plate 32, until the drum 28 reaches a fully expanded state as shown in FIGS. 9a and 9b.

The umbrella motion shown in FIGS. 7a to 9b may be considered a two-stage movement to the extent that it involves an initial tilting stage followed by an expansion stage during which the plates translate radially. Other two-stage movements are possible, for example by reversing the order of operations shown in FIGS. 7a to 9b to expand the drum 28 to an intermediate position in a first stage of movement, before expanding the front of the drum 28 to tilt the plates 32 into the fully expanded state of FIG. 9b in a second state of movement. It is also possible for the tilting and expansion movements to occur simultaneously, for example by operating all actuators 38 at once but expanding the front set of actuators 38 at a higher rate than the rear set of actuators 38.

Figure 10:
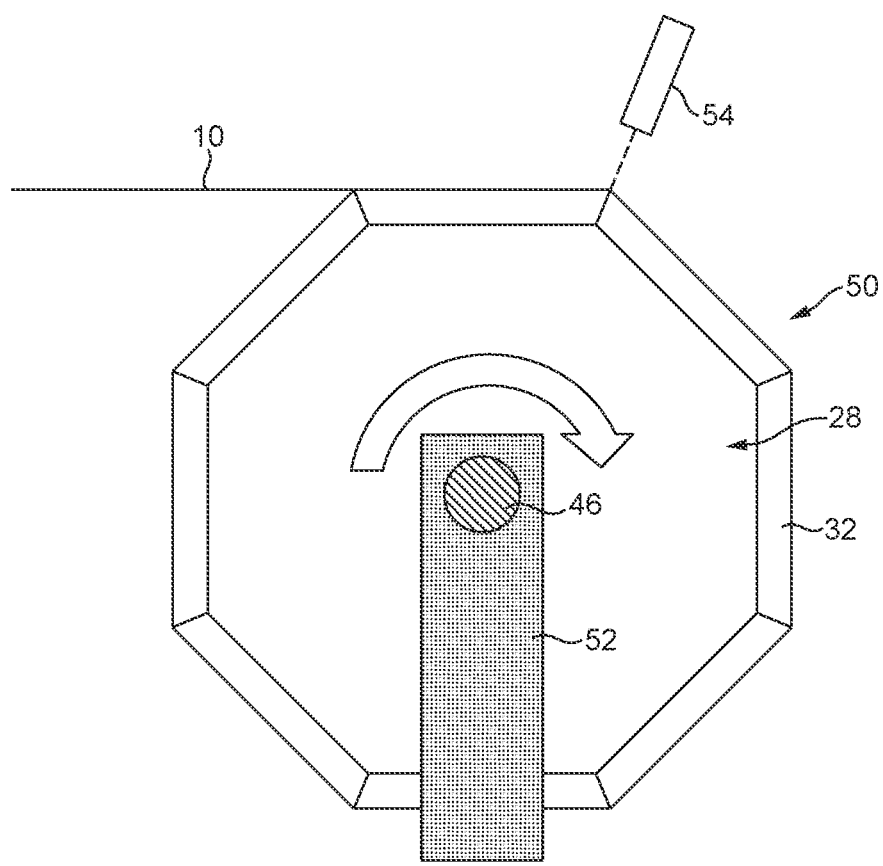
FIG. 10 shows a web processing system incorporating the drum of FIG. 3.

With the operation of the drum 28 described, referring now to FIG. 10 the drum 28 is shown in its context of use as part of a web processing system 50. The web processing system 50 is configured to rotate the drum 28 while feeding a web 10 onto the web-receiving loop 30, to build up layers of the web 10 on the drum 28 until a target number of layers is reached, and to divide the reeled web 10 into discrete stacks by expanding the drum 28.

The drum axle 46 is mounted between a pair of pillars 52 defining a drum support, one of which pillars is visible in FIG. 10, so that the drum 28 is suspended between the pillars and can rotate in the direction indicated by the arrow. Rotation of the drum 28 is effected by a drive mechanism such as an electric motor (not shown) in the conventional manner. The motor may be integrated into the drum 28, or may be separate from the drum 28 and part of the wider system.

As the drum 28 rotates, it draws a web 10 around its web-receiving loop 30, building up layers of the web 10 until a sufficient number is reached, at which point the drum 28 is expanded using one of the movement modes described above to apply tension to the web 10 and divide the web 10 into discrete stacks. The web 10 is fed onto the web-receiving loop 30 of the drum 28 by a feed system (not shown) that may either be part of the web processing system 50 or a separate system.

It is noted that the approximately circular shape of the web-receiving loop 30 acts to minimise peaks in the tension within the web 10 during reeling, as well as minimising the bend radius imposed on the web 10 at each interface between adjacent plates 32. Although the web tension, or hoop stress, will rise each time the web 10 is engaged by one of the 'corners' of the drum 28, namely the interfaces between the plates 32, as the angle between the plates 32 is shallow the increase in tension is minimal. This in turn minimises the risk of stretching and potentially rupturing the web 10 during reeling.

It will be appreciated that increasing the number of faces on the drum 28 will have the effect of smoothing tension applied to the web 10 during reeling, and so in practice the drum 28 may have more than eight faces.

The web processing system 50 also includes discontinuity-forming apparatus in the form of a laser ablation machine 54, which is configured to form discontinuities into the web 10 at predefined angular positions corresponding to interfaces between neighbouring plates 32 of the drum 28. This may be achieved by controlling operation of the laser ablation machine 54 in response to an output from an encoder associated with a motor (not shown) that turns the drum 28 on its central axle 46, for example, such that the laser ablation machine 54 forms a new discontinuity each time an interface between neighbouring plates 32 aligns with a predetermined angular position.

Discontinuities may be formed as the drum 28 rotates, or alternatively the drum 28 may be stopped at each of the predefined angular positions while a discontinuity is formed.

The discontinuities formed by the laser ablation machine 54 include thinned regions extending transversely across the web 10, in which the coating layers of the web 10, namely the anode, electrolyte and cathode layers 14, 16, 18, are removed by ablation to expose the substrate 12; and transverse series of perforations that puncture through all layers of the web 10. In general terms, the perforations and thinned regions may be considered discontinuities to the extent that they break the uniformity of the coatings. In this embodiment, the discontinuities are formed during reeling, but in other embodiments the discontinuities may be formed before or after reeling.

For cases where the web comprises a substrate 12 carrying coatings on both sides, the coatings may be removed by the laser ablation machine 54 in one operation by tuning the machine to operate through the transparent substrate 12, using known principles.

In this embodiment, the laser ablation machine 54 is configured to perform the dual operations of ablating the web 10 to remove the coating layers 14, 16, 18 to expose the substrate 12, and also to penetrate the substrate to form a series of perforations that extends transversely across the web 10 through the centre of each ablated region. However, in different embodiments these operations may be performed by two separate devices, which may be positioned at respective angular positions.

It is also possible to position the laser ablation machine 54 upstream of the drum 28, to form discontinuities into portions of the web 10 that are yet to reach the drum 28.

Accordingly, the laser ablation machine 54 enables the web processing system 50 to prepare the web 10 for dividing into discrete stacks when the drum 28 is expanded, by perforating or otherwise weakening the web 10 transversely at spaced intervals. The intervals are determined such that, once the web 10 is reeled onto the drum 28, the perforations in each layer of the web 10 align with one another to form angularly-aligned groups that coincide with each interface between adjacent faces of the drum 28.

In this way, when tension in the web 10 rises as the drum 28 expands, the weakening effect of the perforations ensures that the web 10 breaks along each set of perforations, which therefore act to control the points at which the web 10 divides when the drum 28 expands.

Figure 11:
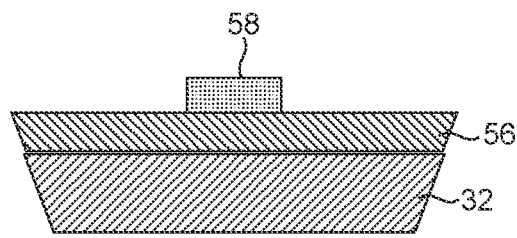
FIG. 11 is a detail view of a plate of the drum of FIG. 3 following expansion.

Breaking the web 10 along each set of perforations results in a respective discrete stack of web portions on each plate 32. This is illustrated in FIG. 11, which shows one of the plates 32 of the drum 28 in close-up after the drum 28 has been expanded, and illustrates a stack 56 of web portions supported on the web-receiving surface 36 of the plate 32. As the perforations are formed in angular alignment with the interfaces between each pair of plates 32, the shape of the stack 56 effectively continues the trapezoidal shape of the plate 32.

A clamp 58 holds the web 10 in place during and after expansion of the drum 28. It should be appreciated that corresponding clamped stacks 56 of web portions are present on each of the other plates 32 of the drum 28, but these are omitted from FIG. 11 for simplicity.

It follows that each face of the drum 28 acts as a support for a respective stack 56 of web portions, and the width of the stacks 56 formed corresponds to the width of the web-receiving surfaces 36 of the plates 32. Accordingly, the shape of the stacks 56 produced by the drum 28 corresponds to the shape of the faces of the drum 28.

As the layers of the web 10 accumulate on the drum 28 during reeling, the overall width of the reel of web 10 on the drum 28 increases. This in turn means that the spacing between the sets of perforations progressively increases, since the perforations are formed at predefined angular positions. This is accounted for automatically in the arrangement shown in FIG. 10, since the laser ablation machine 54 forms each new set of discontinuities when the drum 28 is at one of a predefined set of angular positions. The same principle may be applied when the laser ablation machine 54 is positioned upstream of the drum 28. Alternatively, in this case the spacing between each set of discontinuities may be calculated.

The increasing spacing between the sets of perforations implies a corresponding progressive increase in the widths of the anode, electrolyte and cathode layers 14, 16, 18 between each set of perforations during reeling. While this would have a negligible impact on the performance of the final solid-state device, the additional coating material in the higher layers of the reeled web 10 would represent a parasitic mass, and so on balance has a detrimental impact.

For this reason, the laser ablation machine 54 creates the thinned regions around each set of perforations noted above. The widths of the thinned regions progressively increase in line with the spacing between the perforations, to maintain a constant width of the anode, electrolyte and cathode layers 14, 16, 18 between each set of perforations. It follows that, after dividing the web 10 by expanding the drum 28, each discrete stack 56 has a trapezium shape that is composed of a cuboidal stack of complete layers including the coatings, flanked on each side by triangular wedges of substrate material. In this way, the ablation process helps to ensure that the edges of the anode, electrolyte and cathode layers 14, 16, 18 within each stack 56 are aligned.

Figure 12:
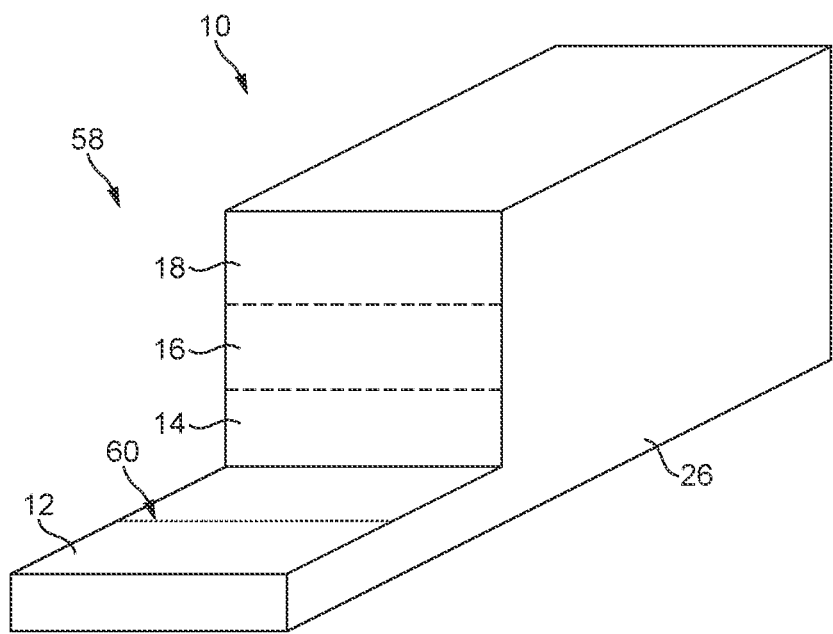
FIG. 12 shows a portion of web that has been processed by the web processing system of FIG. 10.

FIG. 12 shows in schematic form a portion of a web 10 into which discontinuities have been formed, and which is thus ready for breaking by expansion of the drum 28. Specifically, the portion of the web 10 shown includes a thinned region 58 in which the anode, electrolyte and cathode layers 14, 16, 18 have been removed so that only the substrate 12 remains. Ends of the coating layers 14, 16, 18 are visible where they face onto the exposed substrate 12, but the coating layers 14, 16, 18 are not visible along the side of the web 10 as they are covered by a film or foil defining a current collector, as mentioned above, with the cathode current collector 26 being visible in FIG. 12.

The exposed portion of the substrate 12 further includes a row of perforations 60 extending transversely through the centre of the thinned region 58. The perforations 60 are represented here as a regular series of small, circular openings. However, in other embodiments the pattern used for the perforations 60 may vary to optimise the manner in which the substrate 12 breaks when tension is applied. For example, the perforations 60 may be irregularly spaced. Also, different shapes may be used that are configured to generate stress concentrations at the transversely-facing edges of the perforations 60 to lower the tension required to break the substrate 12. In this respect, polygonal perforations 60 may be effective, for example diamond-shaped, parallelogram-shaped or hexagonal perforations 60.

The umbrella mode may be particularly effective for breaking the web cleanly along each set of perforations 60, due to the progressive manner in which this movement mode causes tension to be applied to the web from the front to the back of the drum 28, causing a gradual tear along each series of perforations 60. Use of the umbrella mode may be complemented by perforations 60 that are shaped to create stress concentrations at front edges, such as the polygonal perforations 60 mentioned above.

Equally, the radial mode may also be effective in creating clean breaks at the perforations 60, since it results in even application of pressure throughout the web 10. Again, a complementary perforation shape may be selected where true radial motion is to be used, for example a shape having symmetry about a longitudinal axis such as a diamond shape.

It will be appreciated that various changes and modifications can be made to the present invention without departing from the scope of the present application.

For example, other movement modes for the drum may also be possible and helpful in different embodiments. For example, the plates may be supported for translational movement along axes parallel to the central axis 34, and/or to rotate around such axes.

Some embodiments may employ movement modes in which only a subset of the plates move. For example, alternative plates may move radially to expand the drum. It is noted, however, that movements of this kind will create shear stress in the reeled web, which may have a negative impact on the division of the web.

Although the drum of the embodiment described above comprises a frame to support the drum segments relative to one another, in an alternative the segments could be interlinked to support each other.

As an alternative, or supplement to laser cutting and/or ablating using a laser ablation machine 54 as described above, mechanical cutting means such as a blade and anvil may be used to perforate and/or thin the web ready for dividing.

The invention claimed is:

1. A method of preparing an elongate web of sheet material for dividing into discrete stacks of web portions after reeling the web onto a drum, the method comprising
forming transverse discontinuities in the web at spaced intervals corresponding to edges of the discrete stacks to be formed, the intervals progressively increasing along the web so that the discontinuities form angularly-aligned groups when reeled onto the drum.

2. The method of claim 1, wherein each discontinuity comprises a transverse series of perforations.

3. The method of claim 2, wherein the perforations of each series are polygonal.

4. The method of claim 2, further comprising perforating the web at irregular intervals to form each series of perforations.

5. The method of claim 1, wherein each discontinuity comprises a thinned portion of the web.

6. The method of claim 5, further comprising forming each thinned portion by removing part of one or more coating layers of the web.

7. The method of claim 5, further comprising ablating the web to form the thinned portion.

8. The method of claim 5, comprising progressively increasing the widths of the thinned portions along the web.

9. The method of claim 8, comprising increasing the widths of the thinned portions in accordance with the intervals between the discontinuities, so that spaces between successive thinned portions are constant along the web.

10. The method of claim 1, wherein each discontinuity comprises a transverse series of perforations extending centrally through a thinned portion of the web.

11. The method of claim 1, comprising forming the discontinuities during reeling of the web.

12. The method of claim 11, comprising forming each discontinuity on a portion of the web that is on the drum.

13. The method of claim 12, comprising reeling multiple layers of the web onto the drum, and then perforating the layers together.

14. The method of claim 12, comprising forming each discontinuity when the drum is at one of a set of predefined angular positions.

15. The method of claim 11, comprising forming each discontinuity on a portion of the web yet to be reeled onto the drum.

16. The method of claim 11, comprising forming a discontinuity while the drum rotates.

17. The method of claim 1, wherein the web comprises a substrate layer and one or more coating layers.

18. The method of claim 1, wherein each stack defines a solid-state electrical device.

19. A method of producing stacks of web portions from an elongate web of sheet material, the method comprising:
preparing the web using the method of claim 1;
reeling the web onto a drum so that discontinuities of successive layers of the web align on the drum; and
expanding the drum to increase tension in the web and break the web at each of the discontinuities, thereby dividing the web into respective stacks on each drum segment.

20. A control system arranged to control a web processing system to perform the method of claim 1 to prepare an elongate web of sheet material for dividing into discrete stacks of web portions and/or to produce said stacks of web portions.

21. A web processing system configured to prepare an elongate web of sheet material for dividing into discrete stacks of web portions after reeling the web onto a drum, the system comprising:
discontinuity-forming equipment arranged to form transverse discontinuities in the web at progressively increasing intervals corresponding to edges of the stacks to be formed, so that the discontinuities form angularly-aligned groups when reeled onto the drum.

22. The web processing system of claim 21, wherein the discontinuity-forming equipment is configured to perforate and/or ablate the web to form discontinuities.

23. The web processing system of claim 21, wherein the discontinuity-forming equipment comprises a laser and/or a cutting member.

24. An elongate web of sheet material comprising transverse discontinuities at progressively increasing intervals, wherein each discontinuity comprises a transverse series of perforations.

25. The web of claim 24, comprising a substrate layer and one or more coating layers.

26. The web of claim 24, wherein the perforations of each series are polygonal.

27. The web of claim 24, wherein the perforations of each series are spaced at irregular intervals.

28. The web of claim 24, wherein each discontinuity comprises a thinned portion of the web.

29. The web of claim 28, comprising forming each thinned portion by removing part of one or more coating layers of the web.

30. The web of claim 29, wherein the widths of the thinned portions progressively increase along the web.

31. The web of claim 30, wherein the widths of the thinned portions increase in accordance with the intervals between the discontinuities, so that spaces between successive thinned portions are constant along the web.

32. The web of claim 24, wherein each discontinuity comprises a transverse series of perforations extending centrally through a thinned portion of the web.

\* \* \* \* \*